US012632993B2

(12) United States Patent
Ahn et al.

(10) Patent No.: US 12,632,993 B2
(45) Date of Patent: May 19, 2026

(54) METHOD AND APPARATUS FOR POINT CLOUD CODING USING ADAPTIVE DEAD ZONE QUANTIZATION

(71) Applicants:HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 333 days.

(21) Appl. No.: 18/204,447

(22) Filed: Jun. 1, 2023

(65) Prior Publication Data

US 2023/0306650 A1     Sep. 28, 2023

Related U.S. Application Data

(63) Continuation of application No. PCT/KR2021/017973, filed on Dec. 1, 2021.

(30) Foreign Application Priority Data

| Dec. 1, 2020 | (KR) | ........................ | 10-2020-0165726 |
| Dec. 1, 2021 | (KR) | ........................ | 10-2021-0169668 |

(51) Int. Cl.
    *G06K 9/36*          (2006.01)
    *G06K 9/46*          (2006.01)
    (Continued)

(52) U.S. Cl.
    CPC ................ *G06T 9/001* (2013.01); *G06T 9/00* (2013.01); *H04N 19/124* (2014.11); (Continued)

(58) Field of Classification Search
None
See application file for complete search history.

(56) References Cited

U.S. PATENT DOCUMENTS

| 7,280,700 B2 * | 10/2007 | Tourapis | .............. | H04N 19/126 |
| | | | | 375/E7.157 |
| 7,580,584 B2 * | 8/2009 | Holcomb | ............. | H04N 19/176 |
| | | | | 382/233 |

(Continued)

FOREIGN PATENT DOCUMENTS

| CN | 109274967 A | * | 1/2019 | .......... | H04N 19/124 |
| CN | 113395518 A | * | 9/2021 | .......... | H04N 19/124 |

(Continued)

OTHER PUBLICATIONS

CN-109274967-A (machine translation) (Year: 2019).*

(Continued)

*Primary Examiner* — Chan S Park
(74) *Attorney, Agent, or Firm* — Lempia Summerfield Katz LLC

(57) ABSTRACT

A point cloud coding device and a method using a dead zone quantization scheme adaptively, when encoding attribute values of points in a point cloud, are disclosed. The point cloud coding device and method adjust the size of dead zones based on the impact of various characteristics of the points on the prediction performance with the attribute values.

17 Claims, 10 Drawing Sheets

(51) Int. Cl.

| | |
|---|---|
| *G06T 9/00* | (2006.01) |
| *H04N 19/124* | (2014.01) |
| *H04N 19/13* | (2014.01) |
| *H04N 19/597* | (2014.01) |
| *H04N 19/60* | (2014.01) |

(52) U.S. Cl.

CPC ........... *H04N 19/13* (2014.11); *H04N 19/597* (2014.11); *H04N 19/60* (2014.11)

(56) References Cited

U.S. PATENT DOCUMENTS

| | | | | |
|---|---|---|---|---|
| 8,422,546 | B2 * | 4/2013 | Lin | H04N 19/176 |
| | | | | 375/240.06 |
| 8,498,335 | B2 * | 7/2013 | Holcomb | H04N 19/14 |
| | | | | 375/240.03 |
| 8,542,731 | B2 | 9/2013 | Tourapis et al. | |
| 8,743,956 | B2 * | 6/2014 | Chono | H04N 19/126 |
| | | | | 375/240.12 |
| 8,792,739 | B2 * | 7/2014 | Sasai | H04N 19/136 |
| | | | | 382/233 |
| 8,885,706 | B2 * | 11/2014 | Bankoski | H04N 19/126 |
| | | | | 375/240.03 |
| 10,468,043 | B2 * | 11/2019 | Dietz | G10L 19/035 |
| 10,861,196 | B2 | 12/2020 | Mammou et al. | |
| 10,964,102 | B2 * | 3/2021 | Vosoughi | G06T 7/37 |
| 11,030,777 | B2 * | 6/2021 | Graziosi | H04N 19/186 |
| 11,122,300 | B2 * | 9/2021 | Helmrich | H04N 19/46 |
| 11,151,748 | B2 | 10/2021 | Chang et al. | |
| 11,461,935 | B2 | 10/2022 | Mammou et al. | |
| 11,830,210 | B2 * | 11/2023 | Lasserre | G06T 15/205 |
| 11,836,954 | B2 * | 12/2023 | Dai | G06T 9/005 |
| 11,935,272 | B2 * | 3/2024 | Mammou | G06T 3/4007 |
| 11,943,457 | B2 * | 3/2024 | Kato | G06T 17/005 |
| 12,160,601 | B2 * | 12/2024 | Meardi | H04N 19/18 |
| 12,236,554 | B2 * | 2/2025 | Alakuijala | H04N 19/124 |
| 2004/0008899 | A1 * | 1/2004 | Tourapis | H04N 19/61 |
| | | | | 375/E7.157 |
| 2006/0268990 | A1 * | 11/2006 | Lin | H04N 19/61 |
| | | | | 375/E7.14 |
| 2007/0140333 | A1 * | 6/2007 | Chono | H04N 19/176 |
| | | | | 375/240.03 |
| 2007/0147497 | A1 * | 6/2007 | Bao | H04N 19/126 |
| | | | | 375/240.03 |
| 2007/0160138 | A1 * | 7/2007 | Wedi | H04N 19/60 |
| | | | | 375/240.03 |
| 2008/0080615 | A1 | 4/2008 | Tourapis et al. | |
| 2008/0240235 | A1 * | 10/2008 | Holcomb | H04N 19/176 |
| | | | | 375/240.03 |
| 2010/0061449 | A1 * | 3/2010 | Cote | H04N 19/159 |
| | | | | 375/240.03 |
| 2013/0004092 | A1 * | 1/2013 | Sasai | H04N 19/13 |
| | | | | 382/233 |
| 2013/0128957 | A1 * | 5/2013 | Bankoski | H04N 19/48 |
| | | | | 375/240.03 |

| | | | | |
|---|---|---|---|---|
| 2016/0027448 | A1 * | 1/2016 | Dietz | G10L 25/45 |
| | | | | 704/500 |
| 2018/0075622 | A1 * | 3/2018 | Tuffreau | G06T 9/001 |
| 2019/0080483 | A1 | 3/2019 | Mammou et al. | |
| 2019/0089957 | A1 * | 3/2019 | Zhang | H04N 19/146 |
| 2020/0013215 | A1 * | 1/2020 | Vosoughi | G06T 17/005 |
| 2020/0043199 | A1 | 2/2020 | Chang et al. | |
| 2020/0090373 | A1 * | 3/2020 | Graziosi | H04N 19/18 |
| 2020/0258247 | A1 | 8/2020 | Lasserre et al. | |
| 2020/0389673 | A1 * | 12/2020 | Helmrich | H04N 19/625 |
| 2021/0099711 | A1 * | 4/2021 | Tourapis | H04N 19/147 |
| 2021/0118190 | A1 | 4/2021 | Mammou et al. | |
| 2021/0195246 | A1 * | 6/2021 | Tourapis | H04N 19/176 |
| 2021/0319593 | A1 * | 10/2021 | Flynn | H03M 7/6029 |
| 2021/0335016 | A1 * | 10/2021 | Li | G06T 9/40 |
| 2021/0335019 | A1 * | 10/2021 | Li | G06T 9/001 |
| 2021/0375007 | A1 * | 12/2021 | Lim | H04N 7/17318 |
| 2022/0108494 | A1 * | 4/2022 | Li | G06T 17/00 |
| 2022/0191520 | A1 | 6/2022 | Kato et al. | |
| 2023/0099049 | A1 | 3/2023 | Mammou et al. | |
| 2023/0147376 | A1 * | 5/2023 | Alakuijala | G06T 3/40 |
| | | | | 382/232 |
| 2023/0215055 | A1 * | 7/2023 | Dai | G06T 9/005 |
| | | | | 382/232 |

FOREIGN PATENT DOCUMENTS

| | | | |
|---|---|---|---|
| EP | 3929881 | A1 | 12/2021 |
| JP | H08251593 | A * | 9/1996 |
| KR | 101193790 | B1 | 10/2012 |
| KR | 20200007734 | A | 1/2020 |
| KR | 20200039757 | A | 4/2020 |
| KR | 20200057077 | A | 5/2020 |
| WO | 2020189296 | A1 | 9/2020 |

OTHER PUBLICATIONS

CN-113395518-A (machine translation) (Year: 2021).*

JP-H08251593-A (machine translation) (Year: 1996).*

Al-Asmari et al., "Bandwidth compression of the digitized HDTV images for transmission via satellites," in Proc. AIAA 14th Int. Commun. Satell. Syst. Conf., Washington, D.C., Mar. 22-26, 1992, pp. 1690-1696. (Year: 1992).*

Artigas et al., "The Discover codec: architecture, techniques and evaluation," in Proc. Picture Coding Symposium, Nov. 2007. (Year: 2007).*

Wei et al., "An improved context adaptive hard-decision quantization algorithm," 2017 13th International Conference on Natural Computation, Fuzzy Systems and Knowledge Discovery (ICNC-FSKD), Guilin, China, 2017, pp. 292-297 (Year: 2017).*

Hsu et al., "Wavelet and lapped orthogonal transforms with overlapped motion-compensation for multiresolution coding of HDTV," in IEEE Transactions on Circuits and Systems II: Analog and Digital Signal Processing, vol. 45, No. 8, pp. 1002-1014, Aug. 1998 (Year: 1998).*

* cited by examiner

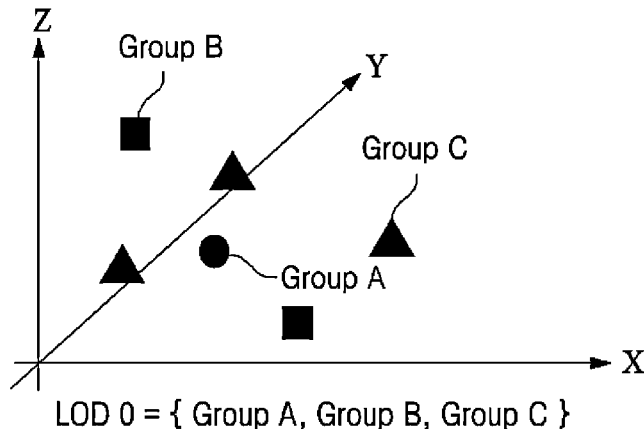
LOD 0 = { Group A, Group B, Group C }
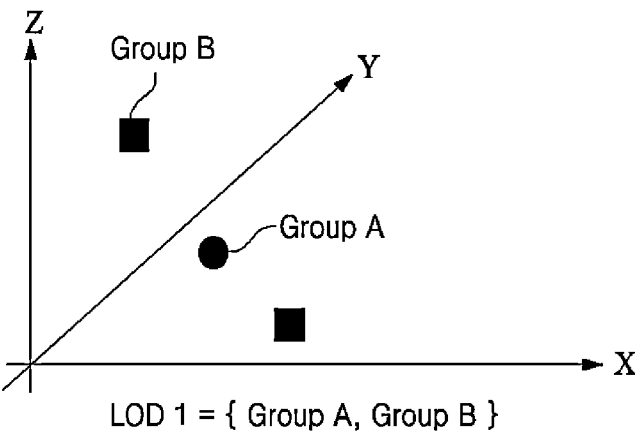
LOD 1 = { Group A, Group B }
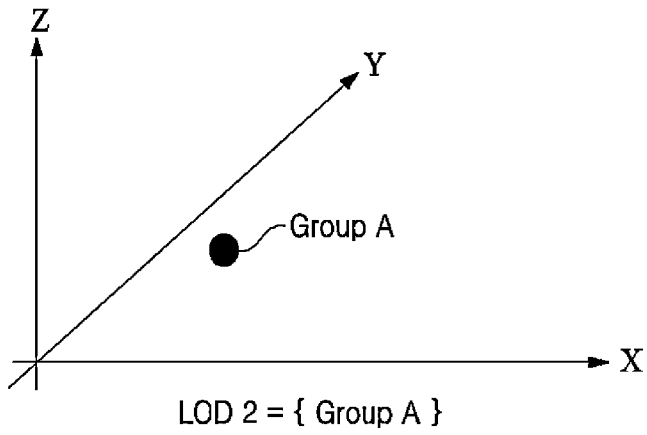
LOD 2 = { Group A }
FIG. 3

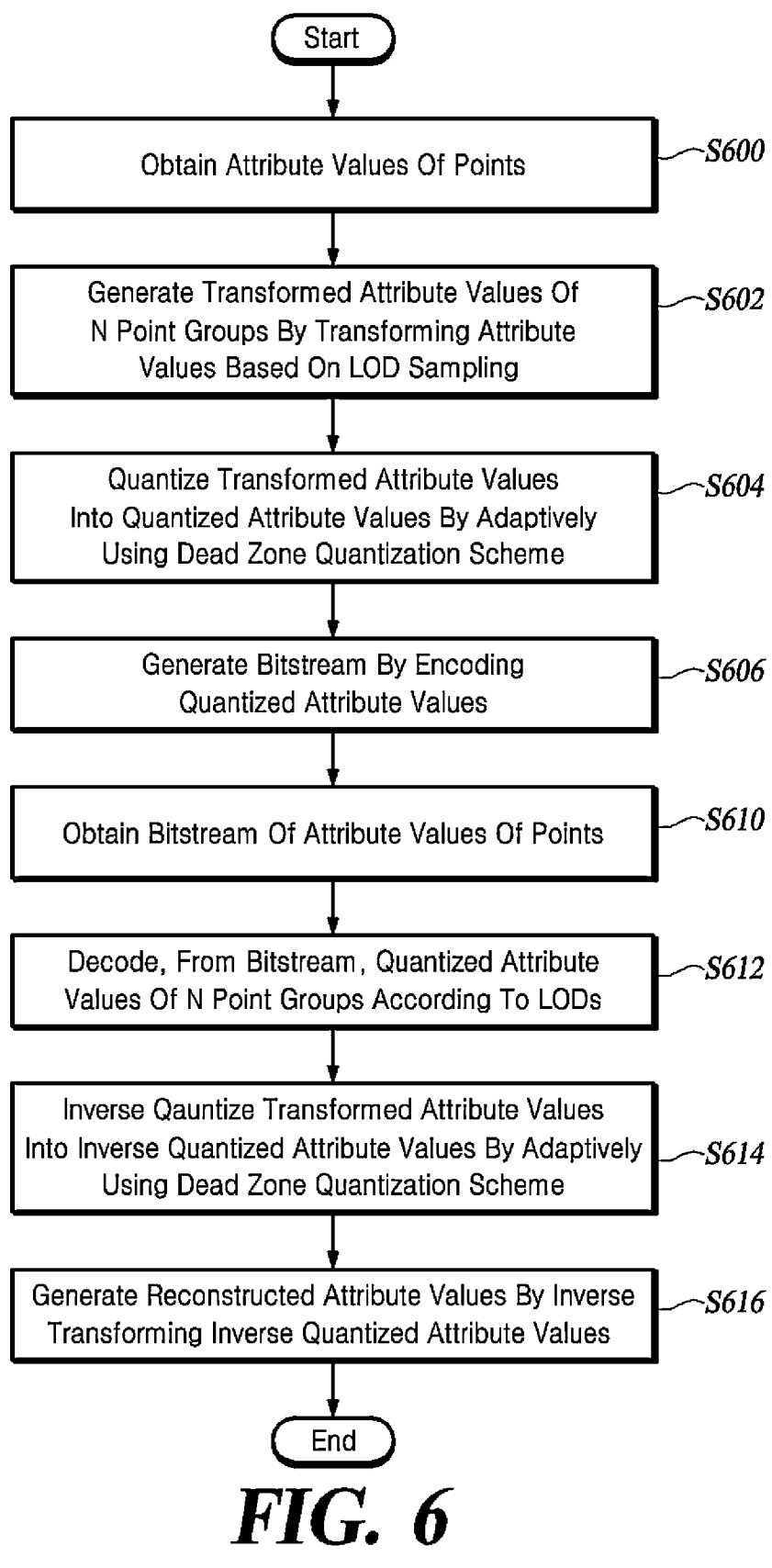

Start

Obtain Attribute Values Of Points — S600

Generate Transformed Attribute Values Of N Point Groups By Transforming Attribute Values Based On LOD Sampling — S602

Quantize Transformed Attribute Values Into Quantized Attribute Values By Adaptively Using Dead Zone Quantization Scheme — S604

Generate Bitstream By Encoding Quantized Attribute Values — S606

Obtain Bitstream Of Attribute Values Of Points — S610

Decode, From Bitstream, Quantized Attribute Values Of N Point Groups According To LODs — S612

Inverse Qauntize Transformed Attribute Values Into Inverse Quantized Attribute Values By Adaptively Using Dead Zone Quantization Scheme — S614

Generate Reconstructed Attribute Values By Inverse Transforming Inverse Quantized Attribute Values — S616

End

*FIG. 6*

METHOD AND APPARATUS FOR POINT CLOUD CODING USING ADAPTIVE DEAD ZONE QUANTIZATION

CROSS-REFERENCE TO RELATED APPLICATIONS

This application is a Continuation of International Application No. PCT/KR2021/017973 filed on Dec. 1, 2021, which claims priority to Korean Patent Application No. 10-2020-0165726 filed on Dec. 1, 2020, and Korean Patent Application No. 10-2021-0169668 filed on Dec. 1, 2021, the entire disclosures of each of which are incorporated herein by reference.

TECHNICAL FIELD

The present disclosure relates to a point cloud coding apparatus and a method using adaptive dead zone quantization.

BACKGROUND

The statements in this section merely provide background information related to the present disclosure and do not necessarily constitute prior art.

Quantization is used for data compression in areas, such as images, videos, point clouds, etc. In general, quantization techniques can be employed at the entry stage of encoding or the exit stage of decoding. Various methods for quantization exist, including such a popular method as the dead zone quantization scheme illustrated in FIG. 1.

In the example of FIG. 1, the graph is a mapping function that quantizes an input value x to a level. Here, the size of the dead zone can be represented by the quantization size $\Delta$, and the ratio $\alpha$ for scaling the dead zone, where a is a real number above zero. The following Equations 1 through 4 show, in order, the size of the dead zone, the quantization formula, the quantization offset formula, and the inverse quantization formula.

$$deadzone = (1 + \alpha) \cdot \Delta \qquad \text{Equation 1}$$

$$level = \text{sign}(x) \cdot \max\left(0, \left[\frac{|x| + \text{offset}}{\Delta}\right]\right) \qquad \text{Equation 2}$$

$$offset = (1 - \alpha) \cdot \frac{\Delta}{2} \qquad \text{Equation 3}$$

$$x_{rec} = level \cdot \left(\Delta + \frac{\alpha}{2}\Delta\right) \qquad \text{Equation 4}$$

Here, sign(x) is a sign function that can give a negative, zero, or positive sign depending on the value of x.

In general, a value of $\alpha$ being 0 indicates that no dead-zone quantization is applicable and represents a uniform quantization scheme. Furthermore, as $\alpha$ increases, the size of the dead zone increases, which accordingly increases the range where the level is zero. In general, the size of the dead zone can be determined to minimize the size of the mean error depending on the distribution of the data to be quantized.

On the other hand, in the process of encoding the attribute information during point cloud coding, the transformed attribute values may be divided into low-frequency components and high-frequency components, and the characteristics of these attribute values may affect the performance of predicting the points in the point cloud. Therefore, to improve the coding efficiency of point cloud coding, such quantization schemes need to be thought up for taking advantage of the characteristics of the attribute values.

SUMMARY

The present disclosure in some embodiments seeks to provide a point cloud coding apparatus and a method using a dead zone quantization scheme adaptively, when encoding attribute values of points in a point cloud. The point cloud coding apparatus and method adjust the size of dead zone based on the impact of various characteristics of the points on the prediction performance with the attribute values.

At least one aspect of the present disclosure provides a method performed by a point cloud decoding apparatus for decoding attribute values of points in a frame. The method comprises obtaining a bitstream of the attribute values. The method also comprises decoding, from the bitstream, quantized attribute values of points in N point groups (wherein N is a natural number greater than or equal to 2) according to level of details (LODs). The method also comprises inverse quantizing the quantized attribute values into inverse quantized attribute values by adaptively using a dead zone quantization scheme based on an index of the N point groups, a LOD of a reference point of a target point in the point groups, and a prediction mode of the target point. The method also comprises generating reconstructed attribute values by inversely transforming the inverse quantized attribute values.

Another aspect of the present disclosure provides an attribute information decoding device for decoding attribute values of points. The attribute information decoding device comprises an entropy decoder configured to decode, from a bitstream of the attribute values, quantized attribute values of points in N point groups (wherein N is a natural number greater than or equal to 2) according to level of details (LODs). The attribute information decoding device also comprises an inverse quantizer configured to inverse quantize the quantized attribute values into inverse quantized attribute values by adaptively using a dead zone quantization scheme based on an index of the N point groups, a LOD of a reference point of a target point in the point groups, and a prediction mode of the target point. The attribute information decoding device also comprises an inverse transformer configured to generate reconstructed attribute values by inversely transforming the inverse quantized attribute values.

Yet another aspect of the present disclosure provides a method performed by a point cloud encoding apparatus for encoding attribute values of points in a frame. The method comprises obtaining the attribute values. The method also comprises generating transformed attribute values of points in N point groups (wherein N is a natural number greater than or equal to 2) by transforming the attribute values based on level of details (LODs) sampling of the attribute values at a reconstructed location of the points. The reconstructed location of the points is provided by a geometric information encoding device in the point cloud encoding apparatus. The method also comprises quantizing the transformed attribute values into quantized attribute values by adaptively using a dead zone quantization scheme based on an index of the N point groups, a LOD of a reference point of a target point in the point groups, and a prediction mode of the target point. The method also comprises generating a bitstream by encoding the quantized attribute values by using entropy coding.

As described above, the present embodiment provides a point cloud coding apparatus and a method using a dead zone quantization scheme adaptively, when encoding attribute values of points in a point cloud. The point cloud coding apparatus and method adjust the size of dead zone based on the impact of various characteristics of the points on the performance of predicting the attribute values, to improve the coding efficiency of point cloud coding.

BRIEF DESCRIPTION OF THE DRAWINGS

FIG. 3 is a conceptual diagram illustrating the level of details (LODs) of a point cloud, according to at least one embodiment of the present disclosure.

FIG. 6 is a flowchart of an attribute information encoding method and an attribute information decoding method, according to at least one embodiment of the present disclosure.

DETAILED DESCRIPTION

Figure 1:
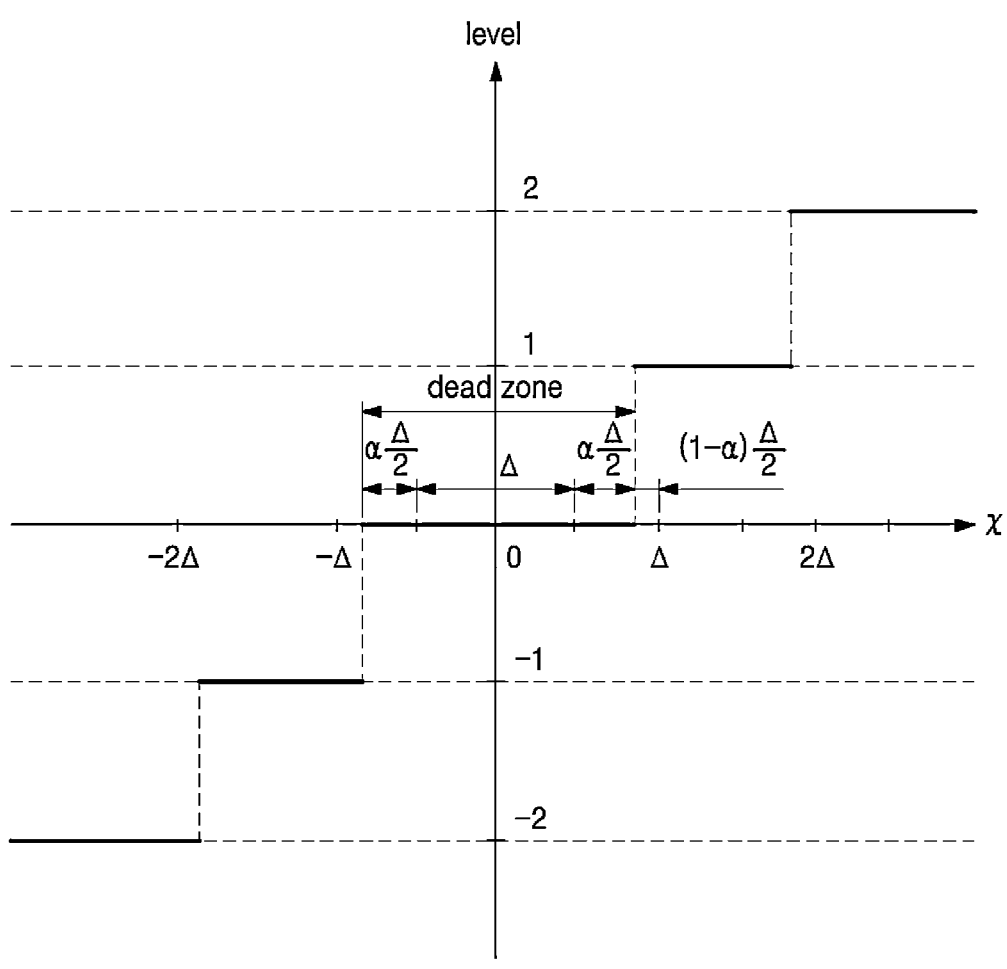
FIG. 1 is a conceptual diagram illustrating a dead zone quantization scheme according to at least one embodiment of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

The present disclosure relates to a point cloud coding device and a method using adaptive dead zone quantization. More specifically, a point cloud coding device and a method using an adaptive dead zone quantization scheme are provided for encoding attribute values of points in a point cloud. The point cloud coding device and method adjust the size of a dead zone based on the impact of various characteristics of the points on the performance of predicting the attribute values.

Points included in a point cloud may be compressed by a point cloud encoding device and then may be stored and transmitted in the form of a bitstream. To enable a human or machine to utilize the point cloud data, a point cloud decoding device may reconstruct the points in the point cloud from the bitstream.

The point cloud includes geometric information representing locations, such as x, y, and z. Further, the point cloud may include attribute information. Here, the attribute information may include color information, such as RGB, YCbCr, etc. The attribute information may also include lidar-related information, such as reflectance, depth, and the like. Further, the attribute information may include a combination of various information such as frame index, point acquisition time, etc.

As described above, since the point cloud includes geometric information, which is the location values of the points, and attribute information, which is the attribute values of the points, the point cloud encoding device includes a geometric information encoding device and an attribute information encoding device to generate a bitstream of location values and a bitstream of attribute values. The point cloud decoding device includes a geometric information decoding device and an attribute information decoding device. The following describes a quantization scheme used in the attribute information encoding device and the attribute information decoding device.

In the following description, the point cloud, the points included in the point cloud, and the points may be utilized interchangeably.

Further, a frame represents an entire point cloud in three-dimensional space acquired at a single point in time.

Figure 2:
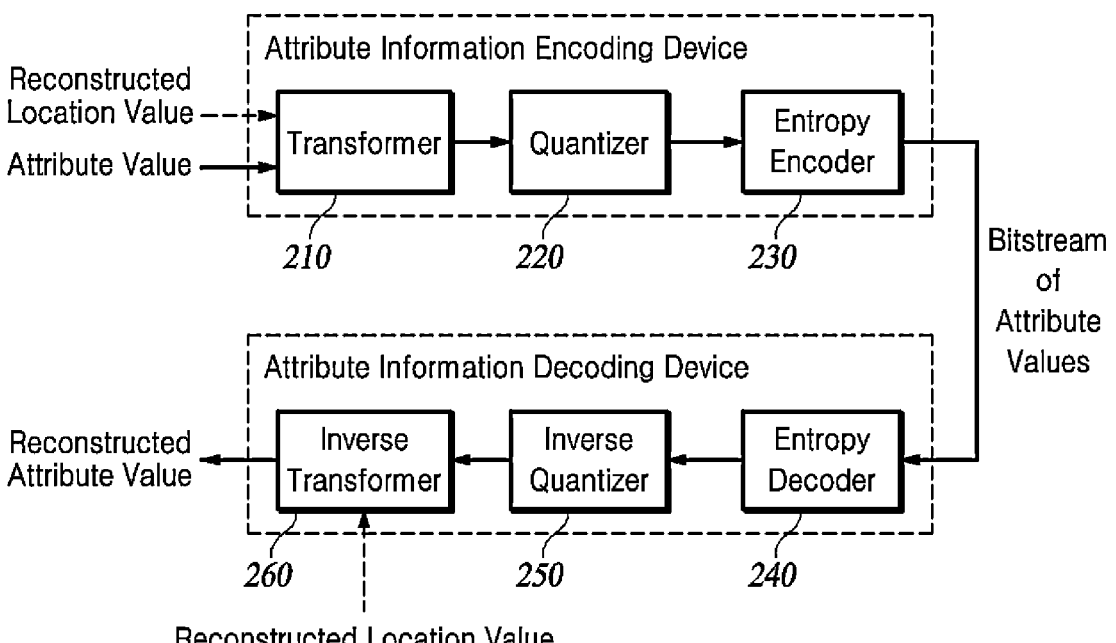
FIG. 2 is a conceptual block diagram illustrating an attribute information encoding device and an attribute information decoding device according to at least one embodiment of the present disclosure.

FIG. 2 is a conceptual block diagram illustrating an attribute information encoding device and an attribute information decoding device according to at least one embodiment of the present disclosure.

The attribute information encoding device according to at least one embodiment of the present disclosure generates a bitstream of attribute values from reconstructed location information of points and attribute values according to the locations. The attribute information decoding device reconstructs the attribute values from the bitstream.

The attribute information encoding device includes a transformer 210, a quantizer 220, and an entropy encoder 230. The attribute information decoding device includes an entropy decoder 240, an inverse quantizer 250, and an inverse transformer 260.

The transformer 210 of the attribute information encoding device generates transformed attribute values in the frequency domain by transforming the attribute values at a reconstructed location with reference to a reconstructed location value. At this time, the reconstructed location value may be received from the geometric information encoding device. The transformer 210 delivers the transformed attribute values to the quantizer 220.

The quantizer 220 quantizes the transformed attribute values by using a dead zone quantization scheme as illustrated in the example of FIG. 1 and Equation 2 to generate quantized attribute values. The quantizer 220 delivers the quantized attribute values to the entropy encoder 230.

The entropy encoder 230 generates a bitstream of attribute values by encoding the quantized attribute values by using entropy coding.

The attribute information encoding device may transmit the bitstream to the attribute information decoding device.

The entropy decoder 240 of the attribute information decoding device decodes quantized attribute values from a bitstream stored or transmitted over a communication interface. The entropy decoder 240 delivers the decoded quantized attribute values to the inverse quantizer 250.

The inverse quantizer 250 generates inverse quantized attribute values by inverse quantizing the quantized attribute values by using a dead zone quantization scheme, as illustrated by the example of FIG. 1 and Equation 4. The inverse quantizer 250 delivers the inverse quantized attribute values to the inverse transformer 260.

The inverse transformer 260 reconstructs the attribute values by inversely transforming the inverse quantized attribute values with reference to the reconstructed location values of the points. At this time, the reconstructed location values may be received from the geometric information decoding device.

Meanwhile, to transform the attribute values, the attribute information encoding device may perform a region adaptive hierarchical transform (RAHT) utilizing the reconstructed location values. Alternatively, the attribute information encoding device may utilize a transform based on the level of detail (LOD) sampling of the reconstructed location values, such as a lifting transform and a predicting transform.

If the attribute values transformed by one of these transforms have changed frequency characteristics, the attribute information encoding device may then take the change in frequency characteristics as a basis for adaptively using the dead zone quantization scheme.

The following describes the operation of the components of the attribute information encoding device and the attribute information decoding device as centered on the lifting transform based on the LOD.

FIG. 3 is a conceptual diagram illustrating the level of details (LODs) of a point cloud, according to at least one embodiment of the present disclosure.

The LOD is a way to provide quality scalability by controlling the density of the point cloud. In the example of FIG. 3, the circles, squares, and triangles are points in a three-dimensional space, representing a single frame. Before determining the LOD, the present embodiment first samples all the points to generate groups. With the circles called Group A, squares called Group B, and triangles called Group C, Groups A, B, and C are included in LOD 0. Namely, LOD 0 is the set of all points in the frame. The set of points excluding group C may be LOD 1, and the set of points excluding group B from LOD 1 becomes LOD 2.

Thus, the first LOD is the largest to include all of the point groups, and the last LOD is the smallest including just one point group. As shown in the example of FIG. 3, the density of points decreases getting near the last LOD. In the following description, the point group contained by the last LOD is represented by the first point group. Therefore, the closer distance to the first LOD away from the last LOD, the more indices of point groups are added to the LOD.

Figure 4:
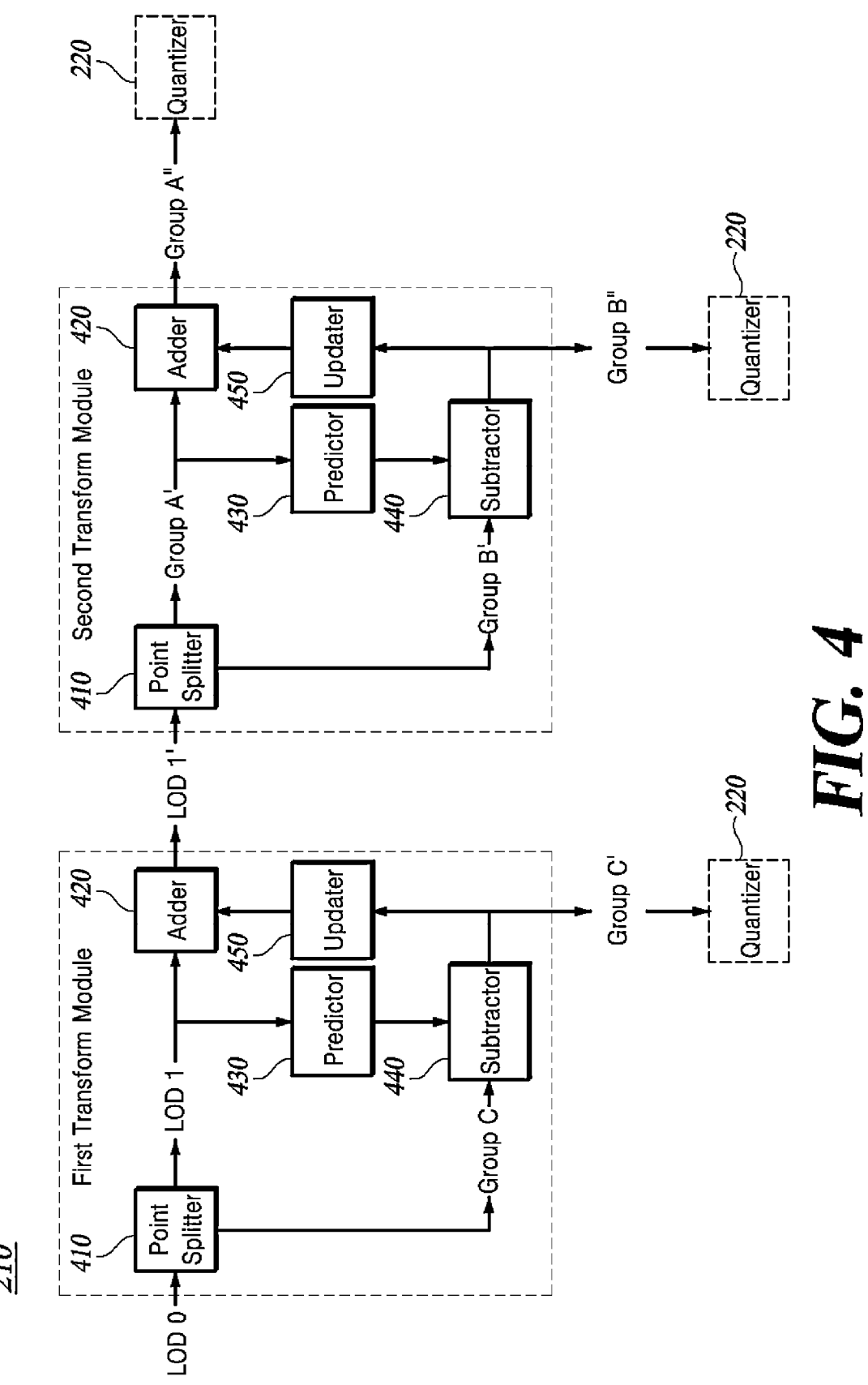
FIG. 4 is a conceptual diagram illustrating a transformer that performs a lifting transform, according to at least one embodiment of the present disclosure.

FIG. 4 is a conceptual diagram illustrating a transformer that performs a lifting transform, according to at least one embodiment of the present disclosure.

The transformer 210 of the attribute information encoding device performs a lifting transform. The lifting transform may separate low-frequency components from high-frequency components of the points by repeatedly performing steps, such as splitting, predicting, and updating the points, based on the LOD. The transformer 210 includes a plurality of transform modules to perform the lifting transform, each transform module including a point splitter 410, an adder 420, a predictor 430, a subtractor 440, and an updater 450.

At this time, transformer 210 may include N−1 transform modules, one less than N, a natural number greater than or equal to 2 as well as the number of levels of the LOD. For example, in the example of FIG. 4, since the LOD includes three levels, the transformer 210 utilizes two transform modules. Since the operation of each transform module is equivalent, the following describes the operation of the first transform module alone.

The point splitter 410 obtains LOD 0 corresponding to the set of all points. The point splitter 410 divides LOD 0 into LOD 1 and group C based on sampling. The point splitter 410 delivers LOD 1 to the adder 420 and predictor 430 and delivers group C to the subtractor 440.

The predictor 430 uses the attribute values of the points in LOD 1 to predict the attribute values of the points in group C. For each of the points in group C, the predictor 430 selects at least one reference point in LOD 1. Hereinafter, the point group subject to prediction is represented as the current group or the target group, and a point in the current group is represented as the current point or the target point.

The predictor 430 may calculate weights based on the distance between the selected reference points and the current point and then may use those weights to weight and sum the attribute values of the reference points to generate a predicted attribute value for the current point. The predictor 430 delivers the predicted attribute value to the subtractor 440.

In another embodiment of the present disclosure, the predictor 430 may determine three reference points in LOD 1 based on distance, may select one of the reference points, and may utilize the attribute value of the selected point as the predicted attribute value of the current point.

In yet another embodiment of the present disclosure, the predictor 430 may select the at least one reference point in LOD 0. For example, the predictor 430 may select, as the reference point, a point within the same LOD as the LOD containing the current point.

As described above, the predictor 430 utilizes the LODs within the same frame to predict the attribute value of the current point. Hereinafter, this is referred to as intra-frame prediction mode.

In other embodiments of the present disclosure, the predictor 430 may perform inter-frame prediction. For example, the predictor 430 may use LODs contained in a frame generated at a different time than the current frame to predict the attribute value of the current point. Hereinafter, this is referred to as inter-frame prediction mode.

The subtractor 440 subtracts the predicted group C from group C to generate a transformed group C' with high-frequency components corresponding to the residues. The subtractor 440 delivers group C' to the updater 450 and the quantizer 220.

The updater 450 uses group C' to generate update values for updating LOD 1. The update values are then added to LOD 1, which has the effect of transforming the attribute values of the points in LOD 1 into low-frequency components. The updater 450 generates update values for the reference points used by the predictor 430 when it predicted the current point. Since there may be cases that multiple current points utilize a single reference point, the updater sums the update values based on multiple current points to generate an update value for a single reference point. The updater 450 delivers the updated values to the adder 420.

The adder 420 sums the attribute values of LOD 1 obtained from the point splitter 410 and the updated values of LOD 1 obtained from the updater 450 to generate transformed LOD 1' that has become a low-frequency component. The adder 420 delivers the LOD 1' to the point splitter 410 of the second transform module. The second transform module can perform the lifting transform in the same order and with the same steps as described above.

The attribute values of group A' generated by the adder 420 of the second transform module may implicitly represent the low-frequency components of the attribute values of all points.

The attribute values that are the high-frequency components generated by the subtractor 440 of each transform module, and the attribute values that are the low-frequency components generated by the adder 420 of the second transform module, are delivered to the quantizer 220.

In conclusion, using the N–1 transform modules, the transformer 210 samples, from the first LOD, the second through N-th LODs and thus generates transformed attribute values of the N-th point group through the first point group. In this case, the first point group is equivalent to the N-th LOD.

Meanwhile, the transformer for performing the predicting transform has a structure of the transformer 210 for performing the lifting transform with the updater 450 and the adder 420 excluded. In other words, the predicting transform is a transform scheme that simplifies the lifting transform.

The quantizer 220 quantizes the transformed attribute values by using a dead zone quantization scheme, as shown in Equation 2, to generate quantized attribute values for the points in the N point groups.

The quantizer 220 may set a ratio $\alpha$ to determine the size of the dead zone. For example, by setting $\alpha$ to 1/3, quantizer 220 may generate quantized attribute values for all point groups by using a dead zone quantization scheme with a dead zone size of $4\Delta/3$.

In another embodiment of the present disclosure, the quantizer 220 may selectively use a dead zone quantization scheme based on the index information of the point group. Here, the index of the point group refers to Group A, Group B, and Group C, as exemplified in FIG. 3.

After obtaining the index of the current group containing the target point for quantizing, the quantizer 220 determines if the current group is a first point group. Here, the first point group is those included in the last sampled LOD, which represents group A in the example of FIG. 3.

When the current group is the first point group, quantizer 220 uses a uniform quantization scheme with a dead zone size of $\Delta$ by setting $\alpha$ to zero. For example, since the points in group A have been transformed to have low-frequency components that approach direct current (DC) and are not those predicted by using reference points, the quantizer 220 may use a uniform quantization scheme with the smallest size of a dead zone.

On the other hand, when the current group is not the first point group, the quantizer 220 may use a dead zone quantization scheme with a dead zone size of $4\Delta/3$ by setting $\alpha$ to 1/3. Therefore, the remaining point groups contain high-frequency attribute values as good as the residues because the remaining point groups are generated using predicted values based on the reference points, as described above. Thus, for the remaining point groups other than the first point group, the quantizer 220 may apply a dead zone quantization scheme with a larger dead zone size, thereby improving coding efficiency.

As yet another embodiment of the present disclosure, the quantizer 220 may adaptively utilize the dead zone quantization scheme based on the index information of the point group.

The quantizer 220 obtains an index of the current group containing the target points for quantizing and compares the index of the current group to a preset intermediate index M. Here, M may be a natural number greater than or equal to 2, less than or equal to N, the number of point groups.

If the index of the current group is greater than the preset intermediate index, the quantizer 220 uses a dead zone quantization scheme with a dead zone size of $4\Delta/3$ by setting $\alpha$ to 1/3.

On the other hand, if the index of the current group is less than or equal to the preset intermediate index, the quantizer 220 further checks whether the current group is the first point group.

If the current group is not the first point group, the quantizer 220 may utilize a dead zone quantization scheme having a dead zone size of $5\Delta/3$ by setting $\alpha$ to 2/3.

On the other hand, if the current group is the first point group, the quantizer 220 may set $\alpha$ to zero and thus may utilize a uniform quantization scheme with a dead zone size of $\Delta$.

The lower the index of the point group is, the more low-frequency components the points contain. Thus, the similarity between the current points and the reference points may be increased, and the prediction performance for the current points may be improved. Thus, when the index of a point group is below a preset intermediate index, the quantizer 220 may apply a dead zone quantization scheme having a larger dead zone size to the point group with a lower index and thus may improve the coding efficiency. However, since the first point group is not predicted using reference points, a uniform quantization scheme having the smallest dead zone size may be applied to the first point group.

In yet another embodiment of the present disclosure, the quantizer 220 may adaptively use a dead zone quantization scheme based on the LOD of the reference points.

After obtaining the LOD of the target point in the current group and the LOD of the reference points, the quantizer 220 determines whether the target point was predicted using the reference points of the same LOD.

If the target point was predicted using the reference points of the same LOD, the quantizer 220 uses a dead zone quantization scheme with a dead zone size of $4\Delta/3$ by setting $\alpha$ to 1/3.

On the other hand, if the target point was not predicted using reference points of the same LOD, the quantizer 220 further checks whether the current group is the first point group.

If the current group is not the first point group, the quantizer 220 may use a dead zone quantization scheme with a dead zone size of $5\Delta/3$ by setting $\alpha$ to 2/3.

On the other hand, if the current group is the first point group, the quantizer 220 may use a uniform quantization scheme with a dead zone size of $\Delta$ by setting $\alpha$ to zero.

When generating the LOD, sampling may be performed based on the distance between points. For example, points in the same LOD may be separated by more than a certain distance, so using points in the same LOD as reference points may result in relatively poor prediction performance for the target point. Whereas, using points in different LODs as reference points may result in improved prediction performance for the target point. Thus, when referencing points in different LODs, the quantizer 220 may apply a dead zone quantization scheme having a larger dead zone size to improve coding efficiency.

As yet another embodiment of the present disclosure, the quantizer 220 may adaptively utilize a dead zone quantization scheme based on a prediction mode of the target point.

After obtaining the prediction mode of the target point in the current group, the quantizer 220 determines whether the prediction mode is an inter-frame prediction mode.

If the prediction mode is inter-frame prediction mode, the quantizer 220 uses a dead zone quantization scheme with a dead zone size of 5Δ/3 by setting α to 2/3.

On the other hand, if the prediction mode is not an inter-frame prediction mode, the quantizer 220 further checks whether the current group is the first point group.

If the current group is not the first point group, the quantizer 220 may use a dead zone quantization scheme with a dead zone size of 4Δ/3 by setting α to 1/3.

On the other hand, if the current group is the first point group, the quantizer 220 may utilize a uniform quantization scheme with a dead zone size of Δ by setting α to zero.

In general, the prediction performance of the inter-frame prediction mode may be better. Thus, when the prediction mode of the target point is inter-frame prediction mode, the quantizer 220 may apply a dead zone quantization scheme having a larger dead zone size to improve encoding efficiency.

In the above description, the ratio α is exemplified as a specific value but is not necessarily limited thereto. For example, the attribute information encoding device may select an optimal value of α in terms of rate distortion when using the adaptive dead zone quantization scheme as described above.

Meanwhile, the attribute information encoding device may transmit the ratio α to the attribute information decoding device.

The entropy encoder 230 generates a bitstream by encoding the quantized attribute values of the points in the group of N points by using entropy coding.

The attribute information encoding device may transmit the bitstream to the attribute information decoding device.

The entropy decoder 240 of the attribute information decoding device decodes the quantized attribute values of the points in the N point groups according to the LOD.

The inverse quantizer 250 may inverse-quantize the quantized attribute values by using a dead zone quantization scheme, as shown in Equation 4, to generate inverse quantized attribute values of the N point groups.

The inverse quantizer 250 may set a ratio α to determine the size of the dead zone. For example, by setting α to 1/3, the inverse quantizer 250 may generate inverse quantized attribute values for points in all point groups by using a dead zone quantization scheme with a dead zone size of 4Δ/3.

In another embodiment of the present disclosure, the inverse quantizer 250 may selectively use a dead zone quantization scheme based on the index information of the point group.

In yet another embodiment of the present disclosure, the inverse quantizer 250 may adaptively utilize the dead zone quantization scheme based on the index information of the point group.

In yet another embodiment of the present disclosure, the inverse quantizer 250 may adaptively use a dead zone quantization scheme based on the LOD of the reference points.

In yet another embodiment of the present disclosure, the inverse quantizer 250 may adaptively utilize the dead zone quantization scheme based on the prediction mode of the target point.

The aforementioned embodiments in which the inverse quantizer 250 utilizes the dead zone quantization scheme are the same as the embodiments in which the quantizer 220 utilizes the dead zone quantization scheme, and thus further detail is omitted.

As yet another embodiment of the present disclosure, the attribute information decoding device may use the ratio α transmitted from the attribute information encoding device in using the dead zone quantization scheme.

Figure 5:
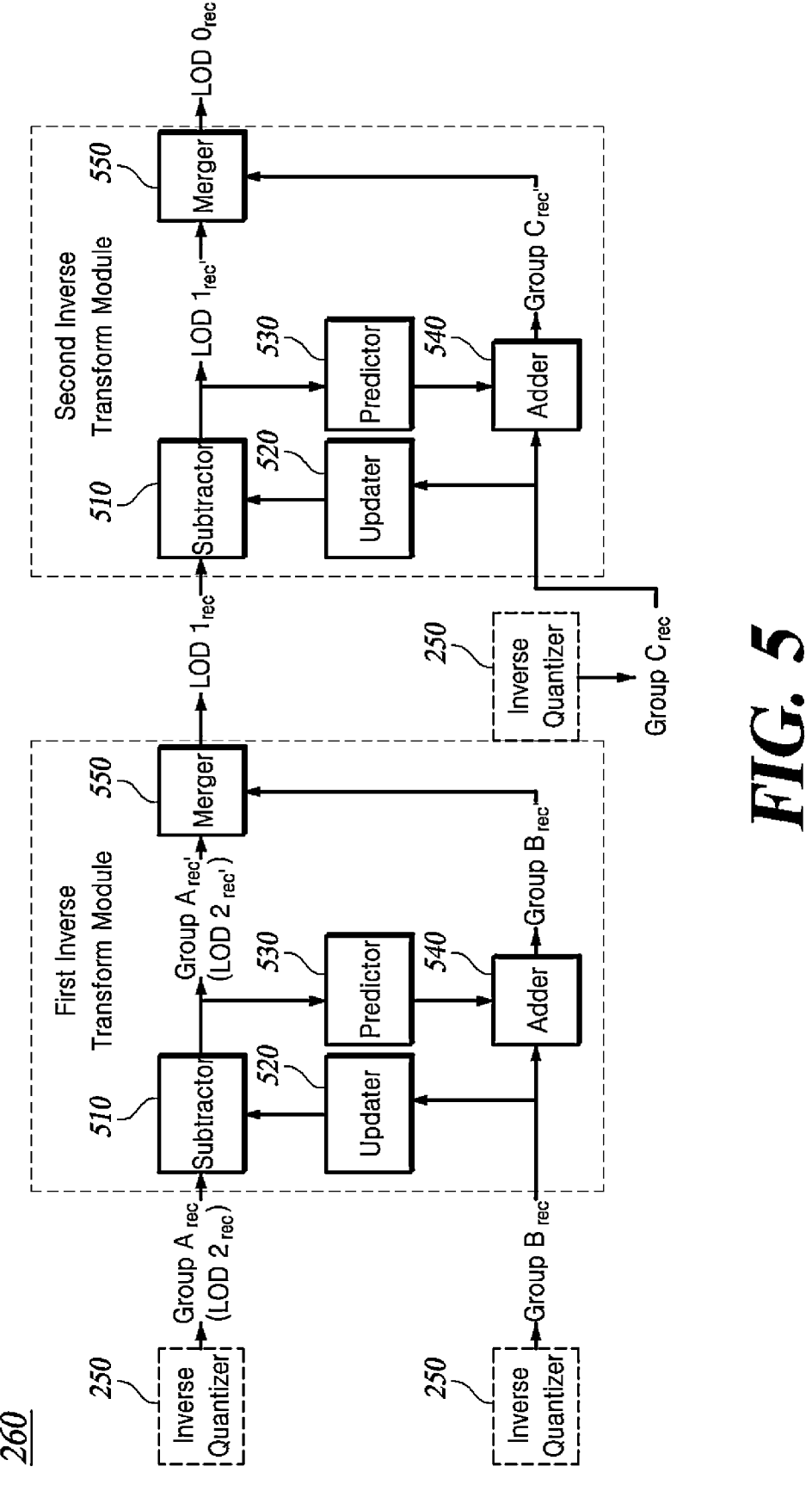
FIG. 5 is a conceptual block diagram illustrating an inverse transformer for performing an inverse lifting transform, according to at least one embodiment of the present disclosure.

FIG. 5 is a conceptual block diagram illustrating an inverse transformer for performing an inverse lifting transform, according to at least one embodiment of the present disclosure.

The inverse lifting transform performed by the inverse transformer 260 is the inverse process of the lifting transform performed by the transformer 210. The attribute values of the points may be reconstructed by repeatedly performing steps, such as updating, predicting, and merging the points, based on the inverse quantized point group. For example, after receiving a point group having a high-frequency component and a low-frequency component, the inverse transformer 260 reconstructs the original attribute values by updating the low-frequency component of the points based on the high-frequency component of the points.

The inverse transformer 260 includes a plurality of inverse transform modules to perform the inverse lifting transform, and each inverse transform module may include subtractor 510, an updater 520, a predictor 530, an adder 540, and a merger 550.

In this case, inverse transformer 260 can include N−1 inverse transform modules, which is one less than N, i.e., the number of levels of the LOD. For example, in the example of FIG. 5, the LOD includes three levels, so the inverse transformer 260 utilizes two inverse transform modules. Since the operation of each inverse transform module is equivalent, the following describes the operation of the first inverse transform module.

The subtractor 510, updater 520, predictor 530, and adder 540 included in the first inverse transform module are functionally equal to the subtractor 440, updater 450, predictor 430, and adder 420 included in the first transform module.

The merger 550 combines the group $A_{rec}$, the point group obtained from the subtractor 510, and the group $B_{rec}$, the point group obtained from the adder 540, into a single group to generate LOD $1_{rec}$. The merger 550 delivers the LOD $1_{rec}$ to the subtractor 510 of the second inverse transform module. The second inverse transform module can perform the same inverse lifting transform as the first inverse transform module.

The attribute values of the points in LOD $0_{rec}$ generated by the merger 550 of the second transform module may be the reconstructed attribute values.

In conclusion, using N−1 inverse transform modules, the inverse transformer 260 combines the N-th LOD through the first LOD from the inverse quantized attribute values of the first point group through the N-th point group. Here, the first point group corresponds to the N-th LOD and the first LOD corresponds to all points in the frame.

The inverse transformer for performing the inverse predicting transform has a structure of the inverse transformer 260 for performing the inverse lifting transform with the updater 520 and the subtractor 510 excluded therefrom. The resultant inverse predicting transform is a simplified version of the inverse lifting transform.

FIG. 6 is a flowchart of an attribute information encoding method and an attribute information decoding method, according to at least one embodiment of the present disclosure.

Hereinafter, an attribute information encoding method (S600 to S606) based on a lifting transform and performed by an attribute information encoding device is described.

The attribute information encoding device obtains attribute values of points in a frame (S600).

The attribute information encoding device transforms the attribute values based on LOD sampling of the attribute values at the reconstructed location of the points to generate the transformed attribute values of the N point groups (S602). Here, the reconstructed location of the points may be provided by a geometric information encoding device in the point cloud encoding device.

The attribute information encoding device samples a second LOD through N-th LOD from the first LOD by using N−1 transform modules and generates transformed attribute values of the N-th point group through the first point group accordingly. In this case, the first LOD includes all points in the frame, and the first point group is equivalent to the last N-th LOD.

The attribute information encoding device adaptively uses a dead zone quantization scheme to quantize the transformed attribute values into quantized attribute values based on the index of the N point groups, the LOD of the reference point of the target point in the point group, and the prediction mode of the target point (S604).

The attribute information encoding device may adaptively apply the dead zone quantization scheme to each of the N point groups.

The attribute information encoding device generates a bitstream by encoding the quantized attribute values by using entropy coding (S606). The attribute information encoding device may generate the bitstream by encoding the quantized attribute values of each of the N point groups.

The attribute information encoding device may transmit the bitstream to the attribute information decoding device.

The following describes an attribute information decoding method (S610 to S616) based on an inverse lifting transform and performed by the attribute information decoding device.

The attribute information decoding device obtains a bitstream of attribute values of points (S610).

The attribute information decoding device decodes, from the bitstream, quantized attribute values of N point groups according to LODs (S612).

The attribute information decoding device decodes the attribute values of the first point group through the N-th point group encoded based on the N-th LOD through the first LOD. In this case, the N-th LOD is equivalent to the first point group, and the first LOD includes all the points in the frame.

The attribute information decoding device inverse quantizes the quantized attribute values into inverse quantized attribute values by adaptively using a dead zone quantization scheme based on the index of the N point groups, the LOD of the reference point of the target point in the point group, and the prediction mode of the target point (S614).

The attribute information decoding device may adaptively apply the dead zone quantization scheme to each of the N point groups.

The attribute information decoding device inversely transforms the inverse quantized attribute values to generate the reconstructed attribute values (S616).

The attribute information decoding device combines the N-th LOD through the first LOD from the inverse quantized attribute values of the first point group through the N-th point group by using N−1 inverse transform modules. The first point group is equivalent to the last N-th LOD, and the first LOD is equivalent to all points in the frame.

Referring now to FIGS. 7-10, various ways in which quantizer 220 uses dead zone quantization are described. Note that the embodiments in which the inverse quantizer 250 employs a dead zone quantization scheme are not described in further detail because these embodiments are the same as the embodiments in which the quantizer 220 employs a dead zone quantization scheme.

Figure 7:
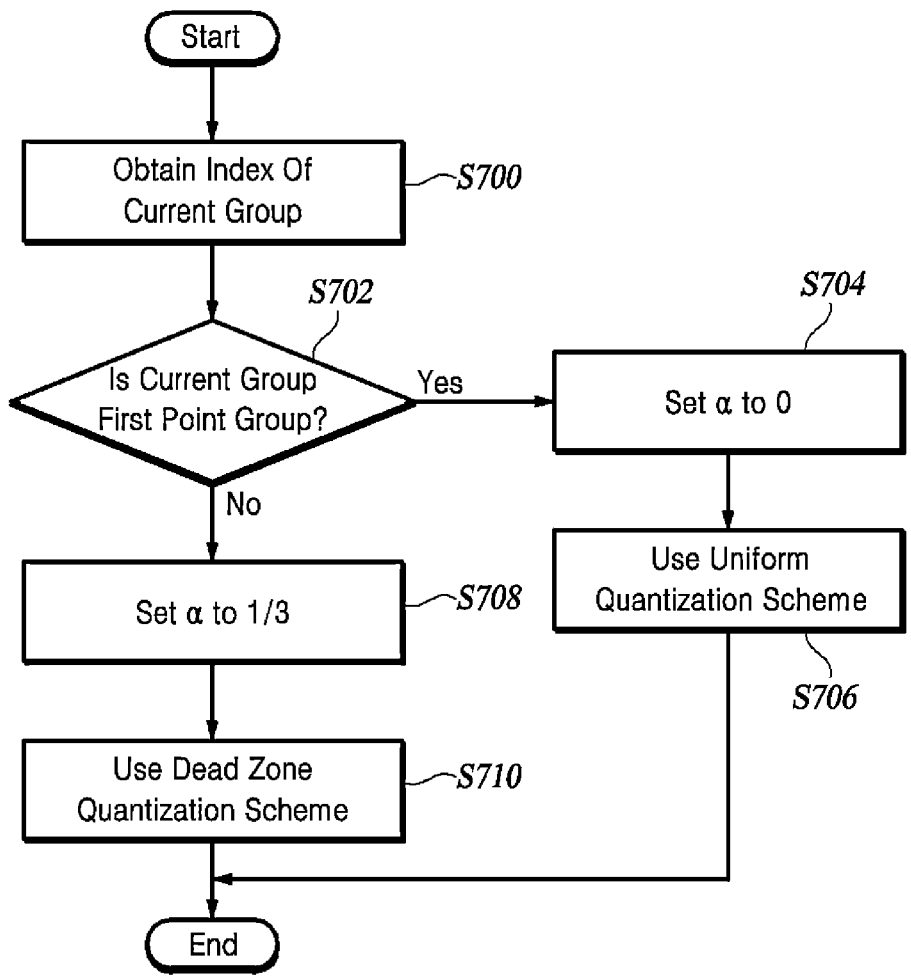
FIG. 7 is a flowchart of a selective dead zone quantization method according to another embodiment of the present disclosure.

FIG. 7 is a flowchart of a selective dead zone quantization method according to another embodiment of the present disclosure.

The quantizer 220 obtains an index of the current group containing the target point to be quantized (S700).

The quantizer 220 determines if the current group is a first point group (S702). Here, the first point group is the set of points included in the last LOD, which represents group A in the example of FIG. 3.

If the current group is the first point group (Yes in S702), the quantizer 220 sets $\alpha$ to 0 (S704) and then uses a uniform quantization scheme with a dead zone size of $\Delta$ (S706). For example, the quantizer 220 may use a uniform quantization scheme when quantizing points in group A that do not use reference points.

On the other hand, if the current group is not the first point group (No in S702), the quantizer 220 sets $\alpha$ to 1/3 (S708) and then uses a dead zone quantization scheme with a dead zone size of $4\Delta/3$ (S710).

In yet another embodiment of the present disclosure, the quantizer 220 may adaptively utilize a dead zone quantization scheme based on the index information of the point group.

Figure 8:
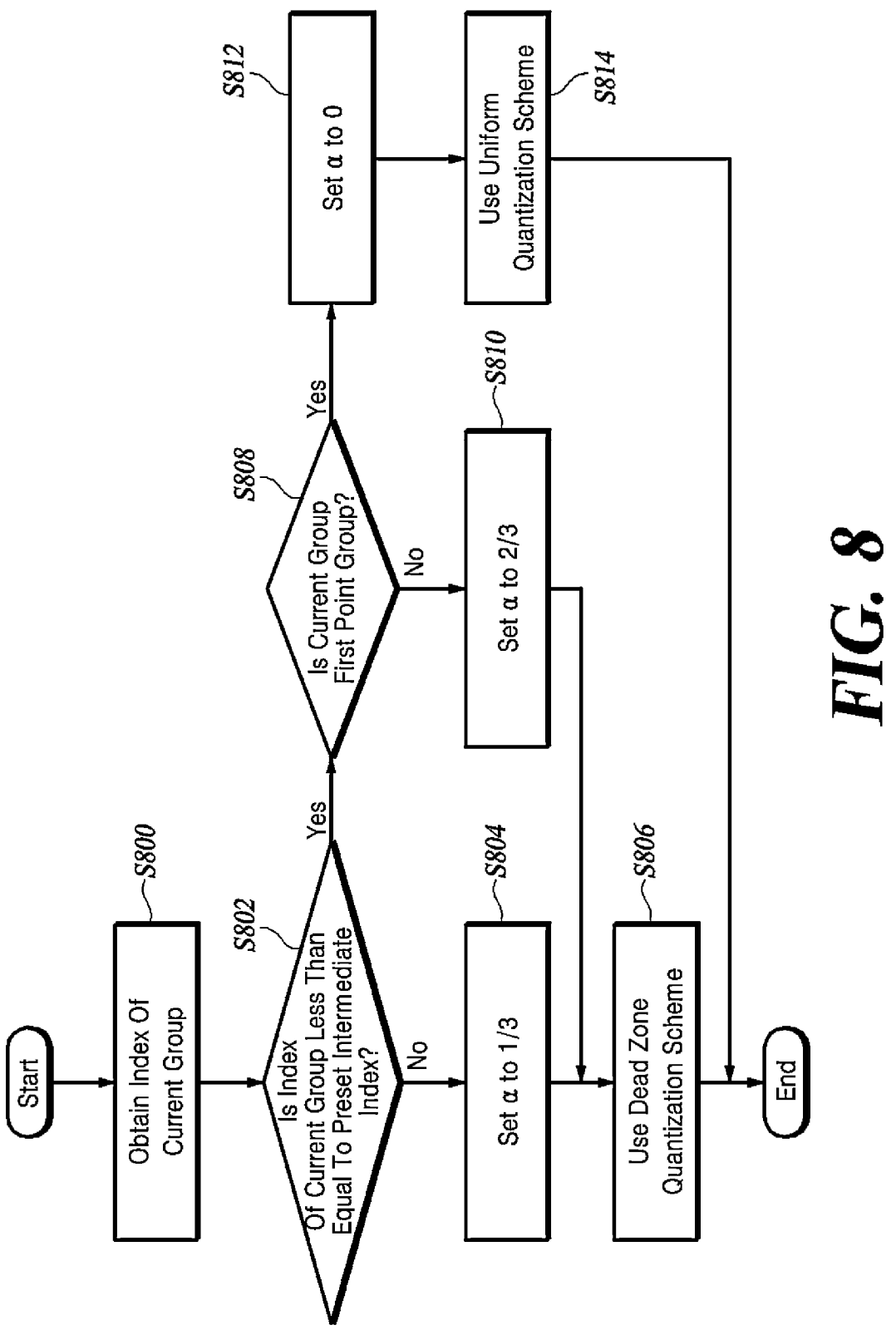
FIG. 8 is a flowchart of an adaptive dead zone quantization method, according to yet another embodiment of the present disclosure.

FIG. 8 is a flowchart of an adaptive dead zone quantization method, according to yet another embodiment of the present disclosure.

The quantizer 220 obtains an index of the current group containing the target point for quantizing (S800).

The quantizer 220 compares the index of the current group with a preset intermediate index M (S802). Here, M may be a natural number greater than or equal to 2, which is less than the number N of point groups.

If the index of the current group is greater than the preset intermediate index (No in S802), the quantizer 220 sets $\alpha$ to 1/3 (S804) and then employs a dead zone quantization scheme with a dead zone size of $4\Delta/3$ (S806).

On the other hand, if the index of the current group is less than or equal to the preset intermediate index, the quantizer 220 further checks whether the current group is the first point group (S808).

If the current group is not the first point group (No in S808), the quantizer 220 may utilize a dead zone quantization scheme having a size of the dead zone of $5\Delta/3$ by setting $\alpha$ to 2/3 (810).

On the other hand, if the current group is the first point group (Yes in S808), the quantizer 220 may set $\alpha$ to 0 (S812) and then may use a uniform quantization scheme with a dead zone size of $\Delta$ (S814).

Figure 9:
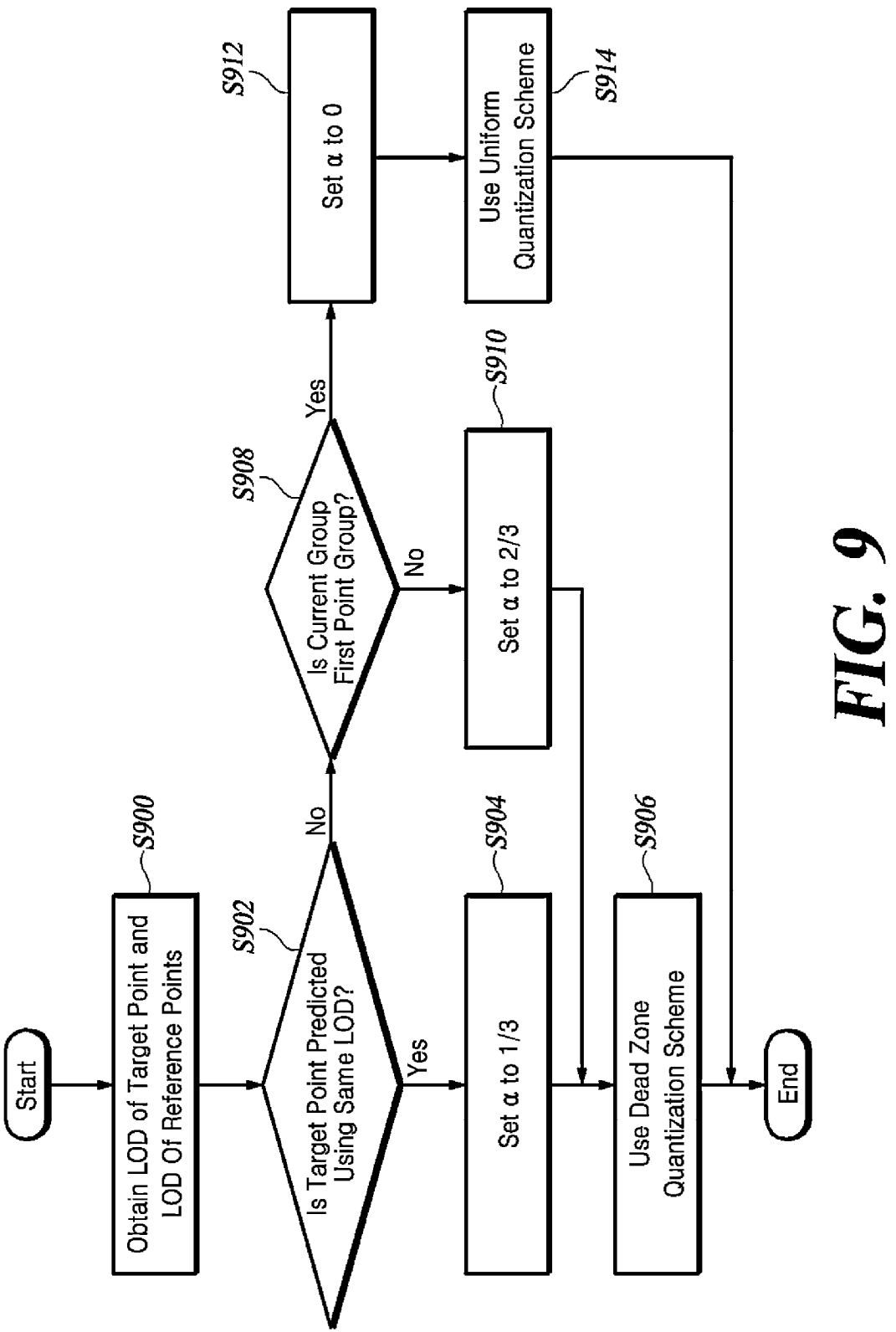
FIG. 9 is a flowchart of a LOD adaptive dead zone quantization scheme, according to yet another embodiment of the present disclosure.

FIG. 9 is a flowchart of a LOD adaptive dead zone quantization scheme, according to yet another embodiment of the present disclosure.

The quantizer 220 obtains the LOD of the target point in the current group and obtains the LOD of the reference points (S900).

The quantizer 220 determines if the target point was predicted by using the reference points in the same LOD (S902).

If the target point was predicted by using the reference points in the same LOD (Yes in S902), the quantizer 220 sets $\alpha$ to 1/3 (S904) and then uses a dead zone quantization scheme with a dead zone size of $4\Delta/3$ (S906).

On the other hand, if the target point was not predicted by using reference points in the same LOD (No in S902), the quantizer 220 further checks whether the current group is the first point group (S908).

If the current group is not the first point group (No in S908), the quantizer 220 sets α to 2/3 (S910) and then uses a dead zone quantization scheme with a dead zone size of 5Δ/3.

On the other hand, if the current group is the first point group (Yes in S908), the quantizer 220 sets α to 0 (S912) and then uses a uniform quantization scheme with a dead zone size of Δ (S914).

Figure 10:
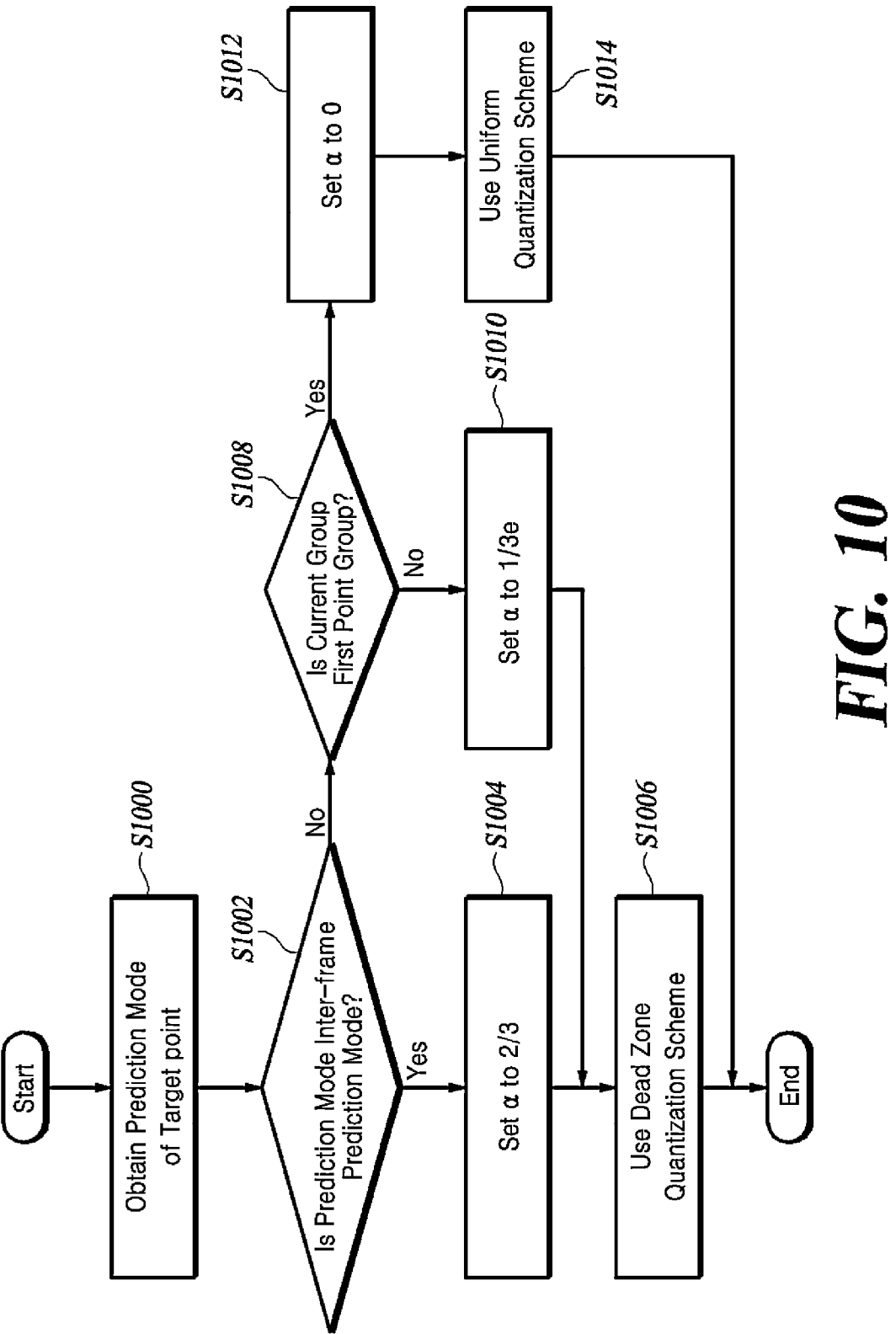
FIG. 10 is a flowchart illustrating a prediction mode adaptive dead zone quantization method according to yet another embodiment of the present disclosure.

FIG. 10 is a flowchart illustrating a prediction mode adaptive dead zone quantization method according to yet another embodiment of the present disclosure.

The quantizer 220 obtains a prediction mode of a target point of the current group (S1000).

The quantizer 220 checks whether the prediction mode of the target point is inter-frame prediction mode (S1002).

If the prediction mode is inter-frame prediction mode (Yes in S1002), quantizer 220 sets α to 2/3 (S1004) and then employs a dead zone quantization scheme with a dead zone size of 5Δ/3 (S1006).

On the other hand, if the prediction mode is not an inter-frame prediction mode (No in S1002), the quantizer 220 further checks whether the current group is the first point group (S1008).

If the current group is not the first point group (No in S1008), the quantizer 220 may set α to 1/3 (S1010) and then utilize a dead zone quantization scheme having a size of the dead zone of 4Δ/3.

On the other hand, if the current group is the first point group (Yes in S1008), the quantizer 220 may set α to 0 (S1012) and then use a uniform quantization scheme with a dead zone size of Δ (S1014).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

210: transformer
220: quantizer
230: entropy encoder
240: entropy decoder
250: inverse quantizer
260: inverse transformer

What is claimed is:

1. A method performed by a point cloud decoding apparatus for decoding attribute values of points in a frame, the method comprising:
    obtaining a bitstream of the attribute values;
    decoding, from the bitstream, quantized attribute values of points in N point groups according to level of details (LODs), wherein N is a natural number greater than or equal to 2;
    inverse-quantizing the quantized attribute values by adaptively using a dead-zone quantization scheme based on a point-group index, a LOD of a reference point of a target point, and a prediction mode of the target point; and
    generating reconstructed attribute values by inversely transforming inverse-quantized attribute values.

2. The method of claim 1, wherein decoding the quantized attribute values comprises:
    decoding quantized attribute values of points in a first point group through an N-th point group and are encoded based on an N-th LOD through a first LOD wherein the N-th LOD is equivalent to the first point group, and the first LOD includes all of the points in the frame.

3. The method of claim 1, wherein inverse quantizing comprises:
    inverse-quantizing quantized attribute values by using a dead-zone quantization scheme having a preset dead-zone size.

4. The method of claim 2, wherein inverse quantizing comprises:
    inverse-quantizing quantized attribute values of points in the N-th point group through a second point group by using a dead-zone quantization scheme having a preset dead-zone size; and
    inverse-quantizing quantized attribute values of points in the first point group by using a uniform quantization scheme.

5. The method of claim 2, wherein inverse quantizing comprises:
    inverse-quantizing quantized attribute values of points in point groups having an index greater than M by using a dead-zone quantization scheme having a preset first dead-zone size, wherein M is a natural number greater than 2, smaller than N;
    inverse-quantizing quantized attribute values of points in an M-th point group through a second point group by using a dead-zone quantization scheme having a preset second dead-zone size; and inverse-quantizing quantized attribute values of points in the first point group by using a uniform quantization scheme, wherein the first preset dead-zone size is smaller than the second preset dead-zone size.

6. The method of claim 2, wherein inverse quantizing comprises:

when the target point was predicted using a point in a same LOD as the reference point, inverse-quantizing a quantized attribute value of the target point by using a dead-zone quantization scheme having a preset first dead-zone size; and when the target point was predicted using a point in a different LOD as the reference point and is in the N-th point group through a second point group, inverse-quantizing a quantized attribute value of the target point by using a dead-zone quantization scheme having a preset second dead-zone size; and when the target point was predicted using a point in a different LOD as the reference point and is in the first point group, inverse-quantizing a quantized attribute value of the target point in the first point group by using a uniform quantization scheme, wherein the first preset dead-zone size is smaller than the second preset dead-zone size.

7. The method of claim 2, wherein inverse quantizing comprises:

when the target point was predicted using a point in a LOD of a different frame, inverse-quantizing a quantized attribute value of the target point by using a dead-zone quantization scheme having a preset first dead-zone size; and when the target point was predicted using a point in a LOD of a same frame and is in a second point group through a N-th point group, inverse-quantizing a quantized attribute value of the target point by using a dead-zone quantization scheme having a preset second dead-zone size; and when the target point was predicted using a point in a LOD of a same frame and is in the first point group, inverse-quantizing a quantized attribute value of the target point in the first point group by using a uniform quantization scheme, wherein the first preset dead-zone size is greater than the second preset dead-zone size.

8. The method of claim 2, wherein generating the reconstructed attribute values comprises:

merging, by using N−1 inverse transform modules, the N-th LOD through the first LOD from inverse quantized attribute values of the first point group through the N-th point group, wherein the first LOD includes all of the points in the frame.

9. A method performed by a point cloud encoding apparatus for encoding attribute values of points in a frame, the method comprising:

obtaining the attribute values;

generating transformed attribute values of points in N point groups by transforming the attribute values based on level of details (LODs), wherein N is a natural number greater than or equal to 2;

quantizing the transformed attribute values by adaptively using a dead-zone quantization scheme based on a point-group index, a LOD of a reference point of a target point, and a prediction mode of the target point; and generating a bitstream by encoding the quantized attribute values.

10. The method of claim 9, wherein generating the transformed attribute values comprises:

sampling, from a first LOD by using N−1 transform modules, a second LOD through an N-th LOD; and generating an N-th point group through a first point group based on the first LOD to the N-th LOD, wherein the first LOD includes all of the points in the frame, and the N-th LOD is equivalent to the first point group.

11. The method of claim 9, wherein quantizing comprises:

quantizing the transformed attribute values of the points in the N point groups by using a dead-zone quantization scheme having a preset dead-zone size.

12. The method of claim 10, wherein quantizing comprises:

quantizing transformed attribute values of the points in the N-th point group through a second point group by using a dead-zone quantization scheme having a preset dead-zone size; and quantizing transformed attribute values of the points in the first point group by using a uniform quantization scheme.

13. The method of claim 10, wherein quantizing comprises:

quantizing transformed attribute values of the points in point groups having an index greater than M by using a dead-zone quantization scheme having a preset first dead-zone size, wherein M is a natural number greater than 2, smaller than N;

quantizing transformed attribute values of the points in an M-th point group through a second point group by using a dead-zone quantization scheme having a preset second dead-zone size; and quantizing transformed attribute values of the points in the first point group by using a uniform quantization scheme, wherein the first preset dead-zone size is smaller than the second preset dead-zone size.

14. The method of claim 10, wherein quantizing comprises:

when the target point was predicted using a point in a same LOD as the reference point, quantizing a transformed attribute value of the target point by using a dead-zone quantization scheme having a preset first dead-zone size; and when the target point was predicted using a point in a different LOD as the reference point and is in the N-th point group through a second point group, quantizing a transformed attribute value of the target point by using a dead-zone quantization scheme having a preset second dead-zone size; and when the target point was predicted using a point in a different LOD as the reference point and is in the first point group, quantizing a transformed attribute value of the target point by using a uniform quantization scheme, wherein the first preset dead-zone size is smaller than the second preset dead-zone size.

15. The method of claim 10, wherein quantizing comprises:

when the target point was predicted using a point in a LOD of a different frame, quantizing a transformed attribute value of the target point by using a dead-zone quantization scheme having a preset first dead-zone size; and when the target point was predicted using a point in a LOD of a same frame and is in the N-th point group through a second point group, quantizing a transformed attribute value of the target point by using a dead-zone quantization scheme having a preset second dead-zone size; and when the target point was predicted using a point in a LOD of a same frame and is in the first point group, quantizing a transformed attribute value of the target point by using a uniform quantization scheme, wherein the first preset dead-zone size is larger than the second preset dead-zone size.

16. The method of claim 9, wherein generating the bitstream comprises:

generating the bitstream by encoding quantized attribute values of each of the N point groups.

17. A computer-readable recording medium storing a bitstream generated by a point cloud encoding method for encoding attribute values of points in a frame, wherein the method comprising:

obtaining the attribute values;

generating transformed attribute values of points in N point groups by transforming the attribute values based on level of details (LODs), wherein N is a natural number greater than or equal to 2;

quantizing the transformed attribute values by adaptively using a dead-zone quantization scheme based on a point-group index, a LOD of a reference point of a target point, and a prediction mode of the target point; and generating a bitstream by encoding the quantized attribute values.

* * * * *